(12) United States Patent
Del Gallo et al.

(10) Patent No.: US 6,475,657 B1
(45) Date of Patent: Nov. 5, 2002

(54) CERAMIC MEMBRANE WHICH IS IN AN OXIDE ION CONDUCTOR BASED ON YTTRIUM-STABILIZED ZIRCONIA

(75) Inventors: Pascal Del Gallo, Gif sur Yvette; Guylaine Gouriou, Guyancourt, both of (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 49 days.

(21) Appl. No.: 09/617,501

(22) Filed: Jul. 17, 2000

(30) Foreign Application Priority Data

Jul. 26, 1999 (FR) .............................. 99 09670

(51) Int. Cl.[7] ................................ H01M 8/10
(52) U.S. Cl. .............................. 429/30; 429/31; 429/32; 429/33; 429/40; 429/46
(58) Field of Search .............................. 429/30, 31, 32, 429/33, 40, 46

(56) References Cited

U.S. PATENT DOCUMENTS 5,494,700 A * 2/1996 Anderson et al. ........... 427/115
5,770,326 A   6/1998 Limaye
5,985,113 A * 11/1999 Crome et al. ............... 204/286
6,045,935 A *  4/2000 Ketcham et al. ............. 429/30

FOREIGN PATENT DOCUMENTS

WO    WO 98/48923    11/1998

* cited by examiner

Primary Examiner—Carol Chaney
Assistant Examiner—Dah-Wein D. Yuan
(74) Attorney, Agent, or Firm—Young & Thompson

(57) ABSTRACT

A ceramic membrane having a non-zero volume and including:
  a) a dense layer, having opposed faces of areas S and S' and having a non-zero thickness e, of a solid electrolyte;
  b) two porous electrodes, which are hybrid conductors and have non-zero thicknesses e1 and e'1, which are identical or different, coated on non-zero areas s1 and s'1, which are identical or different, of the two opposed faces of areas S and S' of the solid electrolyte;
  c) two porous current collectors, of non-zero thicknesses, $e_2$ and $e'_2$, which are identical or different, coated on non-zero areas $s_2$ and $S'_2$, which are identical or different, of the two porous electrodes; and
  d) at least one porous covering layer, of non-zero thickness $e_3$, coated on a non-zero area $s_3$, of at least one of the collectors, a thickness E of the membrane is equal to the sum of the thickness of each of the elements a)–d).

21 Claims, 2 Drawing Sheets

CERAMIC MEMBRANE WHICH IS IN AN OXIDE ION CONDUCTOR BASED ON YTTRIUM-STABILIZED ZIRCONIA

BACKGROUND OF THE INVENTION

The invention relates to the field of solid electrochemistry.

The elementary electrochemical cell used for separating oxygen from the air or from a gas mixture containing it generally consists of a ternary system comprising solid electrolyte/electrodes/current collectors.

The solid electrolytes used for separating oxygen from a gas mixture are doped ceramic oxides which, at the operating temperature, are in the form of a crystal lattice having oxide ion vacancies. The associated crystal structures may, for example, be fluorite, perovskite or brown-millerite cubic phases called Aurivillius phases; J. C. Boivin and G. Mairesse have referred to all the crystal phases which are $O^{2-}$ anionic conductors in a general article (Chem. Mat., 1998, pp 2870–2888; "Recent Material Developments in Fast Oxide Ion Conductors").

The electrode materials associated with the solid electrolyte are generally perovskites. These are materials having a crystal structure based on the structure of natural perovskite, $CaTiO_3$, and exhibit good hybrid (ionic and electronic) conductivity properties by virtue of this cubic crystal structure in which the metal ions are located at the corners and at the center of an elementary cube and the oxygen ions are in the middle of the edges of this cube. The electrode materials may also be mixtures of perovskite materials and of a purely ionic conductor or else mixtures based on materials having other crystal phases, for example of the Aurivillius, brown-millerite or pyrochlore type.

The current collecting is provided either by a metal or a metal lacquer or by a metal/"inert oxide" ceramic (such as alumina) mixture, by a metal/carbide (such as silicon carbide) mixture or by a metal/nitride (such as silicon nitride) mixture, in which the main role of the oxide, the carbide or the nitride is to mechanically block the segregation/sintering phenomena that occur because of the high operating temperatures (700° C.<T<900° C.), especially when silver is used as the current collector metal, or by a metal/"hybrid conductor" oxide ceramic (such as an oxide having a perovskite structure of the family of strontium-doped lanthanum manganites) mixture or by a metal/"ion conductor" oxide ceramic (such as yttrium-stabilized zirconia) mixture.

However, the Applicant has found that when a tubular electrochemical cell in which the solid electrolyte is zirconium oxide stabilized with 8% yttria (8% YSZ), the electrodes are made of $La_{0.9}Sr_{0.1}MnO_{3-\delta}$ (LSM) and the current collectors are a silver lacquer is operated at a temperature of between 700 and 900° C., whether at atmospheric pressure or at an internal oxygen pressure of $20\times10^5$ Pa (120 bars) or as at an external oxygen pressure of $120\times10^5$ Pa (120 bar), accelerated ageing of this cell is observed, resulting in a 70% increase in the cell voltage in 40 h of operation; by replacing the current collectors made of silver lacquer with current collectors made of 50/50 vol % Ag/(8% YSZ) or 50/50 vol % Ag/LSM "cermets" or metal/ceramic mixtures, the ageing is slowed down. However, the degradation phenomenon is not completely eliminated since a 6–15% increase in the total voltage is observed for 100 h of operation. When the cell is operated with an internal oxygen pressure of $20\times10^5$ Pa (20 bar) at 780° C., a reduction in the coulombic efficiency and a drop in the voltage are also observed.

In the case of current collectors based on silver lacquer, it has been possible to attribute the ageing (with $1<P<20\times10^5$ Pa) and the drop in coulombic efficiency at high pressure ($P>20\times10^5$ Pa) and at high temperature (800° C.) to three concomitant phenomena:

- a silver sintering/segregation phenomenon for temperatures greater than 750° C.;
- a silver evaporation phenomenon accentuated by the flushing of the cell with hot air, for temperatures greater than 700° C.; and
- a silver diffusion phenomenon at pressure ($20\times10^5$ Pa) through the solid electrolyte at high temperature (>780° C.).

L. S. Wang and S. A. Barnett have described the use of $LaCoO_3$ for covering stabilzied-zirconia-based cells which are covered with an Ag/YSZ mixture. This work has shown that, after 150 h at 750° C., the YSZ/Ag—YSZ(50/50)/$LaCoO_3$ layer (1 μm) system did not lose silver, unlike the system without the "protective" layer of $LaCoO_3$ for which there was, over time, segregation and loss of silver mass by evaporation. However, perovskite $LaCoO_3$ does not have good hybrid conductivity properties.

The Applicant has therefore sought a means of limiting, or indeed stopping, the degradation described above

SUMMARY OF THE INVENTION

This is why the subject of the invention is a ceramic membrane, which is an oxide ion conductor, characterized in that it comprises a non-zero volume, of non-zero total thickness E, of an assembly consisting of:

a) a dense layer, having opposed faces of areas S and S' and having a non-zero thickness e, of a solid electrolyte having, at the electrolysis temperature, a crystal structure which is an oxide ion conductor;

b) two porous electrodes, which are hybrid conductors and have non-zero thicknesses e1 and $e'_1$, which are identical or different, coated on non-zero areas $s_1$ and $s'_1$, which are identical or different, of the two opposed faces of areas S and S' of the said solid electrolyte;

c) two porous current collectors, of non-zero thicknesses $e_2$ and $e'_2$, which are identical or different, coated on non-zero areas $s_2$ and $s'_2$, which are identical or different, of the said two porous electrodes; and d) at least one porous covering layer, of non-zero thickness $e_3$, coated on a non-zero area $s_3$, of at least one of the said collectors, made of a material, or of a mixture of materials, which is chemically compatible with the materials, or the mixture of materials, of the said electrodes, the said collectors and the said solid electrolyte, and the sintering temperature of which is very close to the sintering temperatures of the materials, or of the mixtures of materials, of which the said electrodes, the said collectors and the said solid electrolyte are composed, and characterized in that the thickness E of the said membrane is equal to the sum of the thicknesses of each of the elements mentioned.

The expression "crystal structure which is an oxide ion conductor" should be understood within the context of the present invention to mean any crystal structure which, at the operating temperature, is in the form of a crystal lattice having oxide ion vacancies. The associated crystal structures may, for example, be fluorite, perovskite, brown-millerite cubic phases called Aurivillius phases or else those mentioned in: J. C. Boivin and G. Mairesse, Chem. Mat., 1998, pp 2870–2888; "Recent Material Developments in Fast Oxide Ion Conductors".

The expression "material or mixture of materials, which is chemically compatible with that of the current collector or collectors" should be understood in the present description to mean any material or mixture of materials which, at a sintering temperature of between approximately 600° C. and 1000° C., does not undergo any chemical reaction with that material or those materials of the layer which it covers, namely in the present case, the material or mixture of materials of which the current collector(s) is(are) composed. Such a chemical reaction would possibly be revealed by the appearance of one or more chemical compounds absent in the initial materials or mixtures of materials.

The expression "porous layers" means, in the present description, that the layers of materials in question must be capable of allowing dioxygen to diffuse. More generally, their porosity index is between 10% and 70%, more precisely between 30 and 60%.

The expression "hybrid conductors" in the present description means that the layers of materials in question are both ion and electron conductors.

The expression "very similar sintering temperatures" means that the difference between the sintering temperatures of the porous covering layer and of the current collector is less than or equal to approximately 200° C. When this difference becomes too great, a delamination phenomenon, indicating poor adhesion of the sintered layers, is observed.

The subject of the invention is especially a ceramic membrane, as defined above, comprising two covering layers of thicknesses $e_3$ and $e'_3$, which are identical or different, coated on non-zero areas $s_3$ and $s'_3$, which are identical or different, of each of the said current collectors, and characterized in that the thickness E of the said volume of the said membrane is equal to the sum of the thicknesses $e+e_1+e'_1+e_2+e'_2+e_3+e'_3$ and more particularly a ceramic membrane characterized in that $e_1=e'_1$, $e_2=e'_2$ and, where appropriate, $e_3=e'_3$.

In the ceramic membrane as defined above, e generally ranges between approximately 0.25 mm and approximately 2 mm and more particularly between approximately 0.5 mm and approximately 1 mm, $e_1$ and $e'_1$, generally range between approximately 1 $\mu$m and approximately 50 $\mu$m and more particularly between approximately 10 $\mu$m and approximately 30 $\mu$m, $e_2$ and $e'_2$ generally range between approximately 1 $\mu$m and approximately 100 $\mu$m and more particularly between approximately 20 $\mu$m and approximately 60 $\mu$m and $e_3$ and, where appropriate, $e'_3$, generally range between approximately 1 $\mu$m and approximately 200 $\mu$m and more particularly between approximately 20 $\mu$m and approximately 100 $\mu$m.

According to a first particular embodiment, the subject of the invention is a ceramic membrane, as defined above, consisting of a sheet having plane faces of areas S and of thickness E and especially a sheet of length L ranging between approximately 1 cm and approximately 1 m and more particularly between 5 cm and approximately 50 cm and of width l ranging between approximately 1 cm and approximately 1 m and more particularly between 5 cm and approximately 50 cm.

According to a second particular embodiment, the subject of the invention is a ceramic membrane, consisting of a cylinder of external diameter D and internal diameter d, characterized in that the support layer for the said cylinder is the cylindrical dense layer, of thickness e, of solid electrolyte and in that half the difference D–d is equal to the sum of the thicknesses e, $e_1$, $e'_1$, $e_2$, $e'_2$ and $e_3$, and possibly $e'_3$ and, more particularly, a cylindrical ceramic membrane of length L ranging between approximately 1 cm and approximately 1 m and more particularly between 10 cm and 50 cm.

The solid electrolytes used in the ceramic membrane forming the subject of the present invention are generally doped ceramic oxides which, at the operating temperature, are in the form of a crystal lattice having oxide ion vacancies. The compounds most conventionally used have a fluorite structure. These oxides are represented more particularly by the formula (I):

$$(M_\alpha O_\beta)_{1-x}(R_\gamma O_\delta)_x \qquad (I)$$

in which M represents at least one trivalent or tetravalent atom mainly chosen from bismuth (Bi), cerium (Ce), zirconium (Zr), thorium (Th), gallium (Ga) and hafnium (Hf), $\alpha$ and $\beta$ are such that the $M_\alpha O_\beta$ structure is electrically neutral, R represents at least one divalent or trivalent atom chosen mainly from magnesium (Mg), calcium (Ca), barium (Ba) and strontium (Sr), or gadolinium (Gd), scandium (Sc), ytterbium (Yb), yttrium (Y), samarium (Sm), erbium (Er), indium (In), niobium (Nb) and lanthanum (La), $\gamma$ and $\delta$ are such that the $R_\gamma O_\delta$ structure is electrically neutral and x generally ranges between 0.05 and 0.30 and more particularly between 0.075 and 0.15.

A solid electrolyte may consist, for example, of a single $MO_2$ oxide combined with one or more $R_\gamma O_\delta$ oxides or else of a mixture of oxides $MO_2$ which is combined with one or more $R_\gamma O_\delta$ oxides. As ceramic oxides of formula $M_\alpha O_\beta$, there are principally zirconium oxide ($ZrO_2$), cerium oxide ($CeO_2$), hafnium oxide ($HfO_2$), thorium oxide ($ThO_2$), gallium oxide ($Ga_2O_3$) and bismuth oxide ($Bi_2O_3$). These oxides are doped with one or more oxides chosen generally from magnesium oxide (MgO), calcium oxide (CaO), barium oxide (BaO), strontium oxide (SrO), gadolinium oxide ($Gd_2O_3$), erbium oxide ($Er_2O_3$), indium oxide ($In_2O_3$), niobium oxide ($Nb_2O_3$), scandium oxide ($Sc_2O_3$), ytterbium oxide ($Yb_2O_3$), yttrium oxide ($Y_2O_3$), samarium oxide ($Sm_2O_3$) and lanthanum oxide ($La_2O_3$). As main example of solid electrolytes, there are zirconias (zirconium oxides), gallates (materials based on gallium oxide), BIMEVOX-type materials and stabilized zirconium oxides such as, for example, stabilized zirconia of formula (Ia):

$$(ZrO_2)_{1-x}(Y_2O_3)_x \qquad (Ia),$$

in which x ranges between 0.05 and 0.15, called hereafter YSZ(x in mol %). These compounds operate at temperatures ranging between 700 and 800° C.

The electrodes associated with the solid electrolyte, having identical or different compositions, are especially made of a material or of a mixture of materials having a perovskite ($ABO_3$) or similar structure (pyrochlore ($A_2B_2O_7$), brownmillerite ($A_2B_2O_5$) and BIMEVOX (Aurivillius phases)). Perovskite materials—the main electrode materials, are represented by the formula (II):

$$M_1M_2O_3 \qquad (II)$$

in which $M_1$ represents one or more atoms chosen from families of alkaline earths, lanthanides and actinides and more particularly chosen from La, Ce, Pr, Nd, Pm, Sm, Eu, Gd, Tb, Dy, Ho, Er, Tm, Yb, Lu, Y or Mg, Ca, Sr and Ba, $M_2$ represents one or more atoms chosen from the transition metals, more particularly chosen from Sc, Ti, V, Cr, Mn, Fe, Co, Ni, Cu and Zn. Within the context of the present invention, the electrodes, of identical or different compositions, are more particularly chosen from lanthanum nickel oxide ($LaNiO_3$), calcium lanthanum manganites ($Ca_uLa_vMnO_w$), lanthanum strontium manganites ($La_uSr_vMnO_w$), lanthanum strontium cobaltites ($La_uSr_vCoO_w$), calcium lanthanum cobaltites ($Ca_uLa_vCoO_w$), gadolinium strontium cobaltites ($Gd_uSr_vCoO_w$), lanthanum strontium chromites ($La_uSr_vCrO_w$) lanthanum strontium ferrites ($La_uSr_vFeO_w$) and lanthanum strontium ferrocobaltites ($La_uSr_vCo_dFe_cO_w$), in which u+v and c+d are equal to 1 and w is such that the structure in question is electrically neutral.

The current collectors, coated on the said two porous electrodes, of identical or different compositions, essentially consist either of a metal or of a metal lacquer, such as a gold lacquer or a silver lacquer for example, or of a metal/"inert oxide" ceramic (such as alumina) mixture or of a metal/"hybrid conductor" oxide ceramic (such as a perovskite material) mixture or of a metal/"ion conductor" oxide ceramic (such as (8 mol %) yttrium-stabilized zirconia) mixture or of a metal/"electron conductor" oxide ceramic (such as nickel oxide) mixture or of a metal/carbide (such as silicon carbide) mixture or of a metal/nitride (such as silicon nitride) mixture. The metal used in the current collectors is mainly chosen from transition metals, more particularly from silver, copper and nickel or from noble metals, more particularly from gold, platinum and palladium. They may also be current collector wires based on oxidizable materials but covered with a thin layer of gold, silver or platinum. The current collectors are more particularly made of a mixture of a metal chosen from silver and gold, with one or more compounds of formula (I) as defined above or of a mixture of a metal chosen from silver and gold, with one or more compounds of formula (II) as defined above. The two current collectors most particularly have an identical composition and are made of a mixture of silver and a "ion conductor" ceramic such as yttria-doped zirconia such as YSZ(8%) for example. Each of the current collectors is connected to the external part of the circuit by an electronically conducting wire, often made of a metal identical to that of which the said collector is composed.

According to a variant of the present invention, the cylindrical ceramic membrane as defined above is filled with beads of mullite or of zirconia, so as to improve the fastening of the said wire to the said current collector. The nature of the beads may also be of the metallic or metal carbide type, or with beads of mullite or zirconia, covered with a current collector layer having the same nature as or a different nature from the current collector layer of the tubular electrochemical cell.

The covering layer, coated on at least one of the said collectors, may be a hybrid or an electron conductor or may be insulating. When it is insulating, it may, for example, be an enamel. When it is a hybrid conductor, it may, for example, be a perovskite material or a mixture of perovskite materials or a mixture of perovskite materials or materials of similar families (pyrochlores or brown-millerites) and of purely ionic conductors, and more particularly a compound or a mixture of compounds of formula (II) as defined above. The subject of the invention is particularly a ceramic membrane as defined above, in which the covering layer, coated on at least one of the said collectors, is a compound of formula (IIa):

$$La_{0.8}Sr_{0.2}Co0.8Fe_{0.2}O_w \quad \text{(IIa)}$$

in which w is such that the structure of formula (IIa) is electrically neutral. When there is a covering layer coated on each of the current collectors, these are of identical or different compositions.

The ceramic membrane forming the subject of the present invention is prepared by successive sequences consisting of the deposition of a given commercially available material, followed by the sintering of the resulting combination, using the solid electrolyte as material for supporting the said membrane. These sequences of operations are well known to those skilled in the art. In general, the successive deposition operations are carried out by painting, by spraying, by dip coating or by screen printing, whether on the internal face or on the external face of the device. After each layer has been deposited, the sintering is carried out in air, at the sintering temperature of the said material ranging between 600° C. and 1000° C., depending on the materials, for several hours, generally from 0.5 to 10 hours. Likewise, the solid electrolyte, namely a ceramic membrane of tubular, planar or elliptical geometrical shape, is prepared from commercial products and formed using methods known to those skilled in the art.

According to a last aspect of the present invention, the subject of the latter is the use of a ceramic membrane as defined above, for separating oxygen from the air or from a gas mixture containing it.

BRIEF DESCRIPTION OF THE DRAWINGS

The invention will now be described in relation to the figures, in which.

DETAILED DESCRIPTION OF THE PREFERRED EMBODIMENTS

The following examples illustrate the invention without, however, limiting it.

Preparation of the Electrochemical Cell

Figure 1:
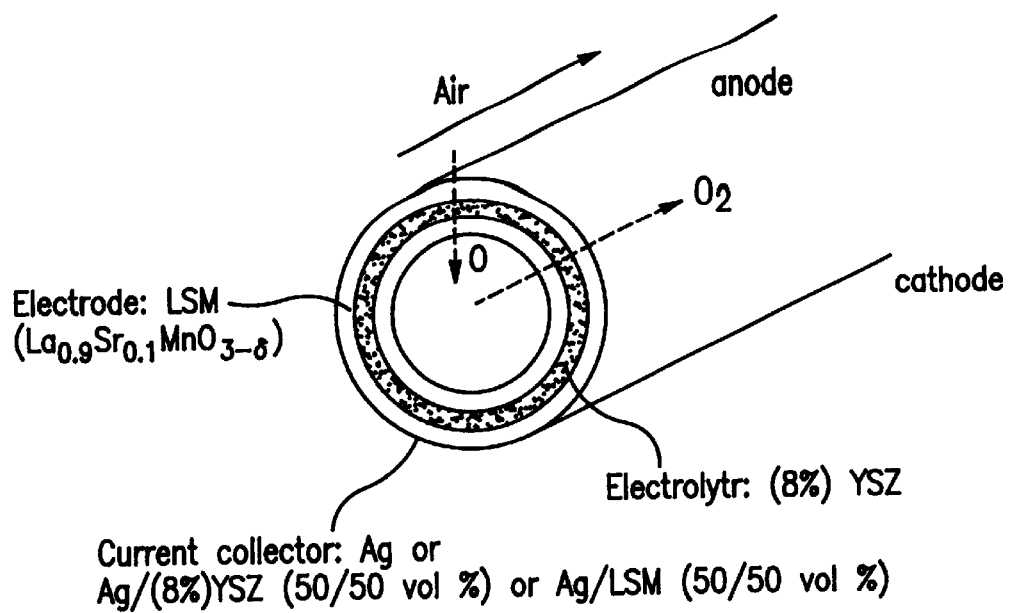
FIG. 1 is a tubular cell according to a first embodiment.

The electrochemical properties of a tubular cell illustrated in FIG. 1 were analysed, the cell being covered on its two faces with two layers of material of the ferrocobaltite family LSCoFe ($La_{0.8}Sr_{0.2}Co_{0.8}Fe_{0.2}O_w$). After each layer had been deposited, the tube was sintered in air at 800° C.–850° C. for a few hours, with temperature holds lasting between 0.5 hours and 6 hours.

EXAMPLE 1

Operating Parameters: Temperature: 780° C.;
Oxygen Internal Pressure: $20 \times 10^5$ Pa (20 bar);
Current: 10 A A tubular electrochemical cell consisting of a solid electrolyte made of (8%)YSZ (length: 355 mm; active area: 68 cm²; thickness: 0.5 mm; internal diameter: 9 mm), of two electrodes made of strontium-doped lanthanum manganite (LSM: $La_{0.9}Sr_{0.1}MnO_x$) (thickness: 10–30 μm; porosity: 30–50%), of two current collectors made of cermet Ag/(8%)YSZ(50/50 by volume) (thickness: 50 μm; porosity between 30 and 50%) and of a protective layer on each of the faces of the membrane made of LSCoFe ($La_{0.8}Sr_{0.2}Co_{0.8}Fe_{0.2}O_w$) (thickness: 50–90 μm; porosity: 20–70%) (deposition conditions: 800° C./0.5–2 h) was prepared.

The system operated continuously for more than 42 days (1000 hours) under $20 \times 10^5$ Pa (20 bar) of oxygen at 780° C. After 18 days (450 h) of operation, the total cell voltage stabilized between 1.7 and 1.9 V. The coulombic efficiency was 100%. The initial increase in the voltage, from 1.35 to 1.7 V, is probably due to the phenomenon of sintering/segregation of the silver particles contained in the Ag/(8 mol %) YSZ current collector cermet. The origin of this phenomenon is the high operating temperature of: the cell (inhomogeneity in the thermal gradient of the furnace (variation from 680 to 800° C.) along the active surface: 24 cm). The various layers (electrodes, current collectors and protective layers) were deposited using the so-called "sprinkler-brush" deposition technique.

Figure 2:
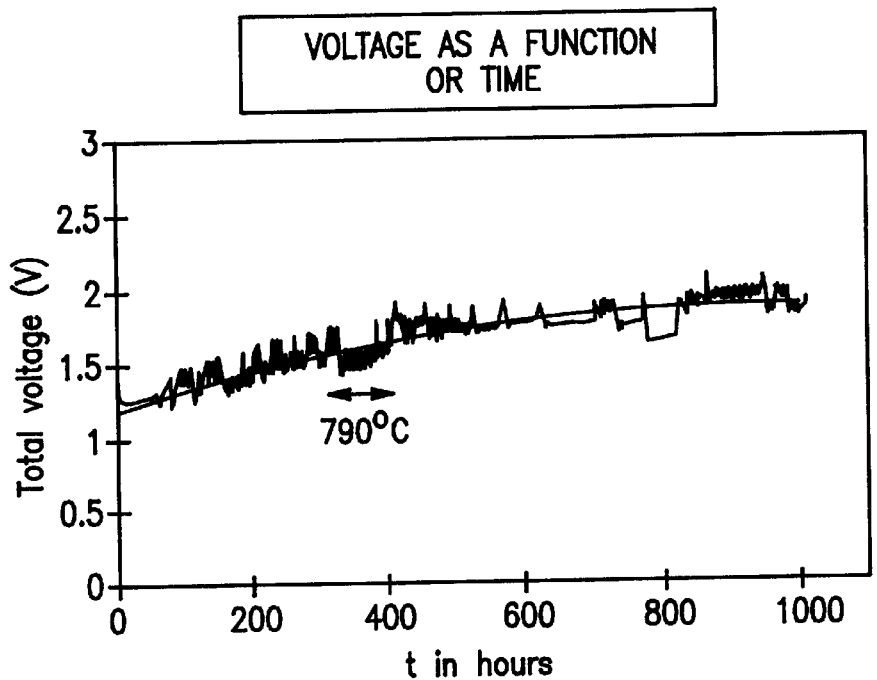
FIG. 2 is a graph analyzing the tubular cell of FIG. 1 under a first set of conditions.

The results are shown in FIG. 2.

EXAMPLE 2

Operating Parameters: Temperature: 765° C.;
Oxygen Internal Pressure: $20 \times 10^5$ Pa (20 bar);
Current: 10 A A tubular electrochemical cell identical in its design to that of Example 1 was used. The variable experimental parameter was the operating temperature, about 765° C. with a temperature gradient of about ±10° C. over the active area. The tubular electrochemical cell consisted of a solid electrolyte made of (8%)YSZ (length: 355 mm; active area: 68 $cm^2$; thickness: 0.5 mm; internal diameter: 9 mm), of two electrodes made of strontium-doped lanthanum manganite (LSM: $La_{0.9}Sr_{0.1}MnO_x$) (thickness: 10–30 $\mu$m; porosity: between 30 and 50%), of two current collectors made of Ag/(8%)YSZ cermet (50/50 by volume) (thickness about 50 $\mu$m; porosity ranging between 30 and 50%) and of a protective layer on the internal and external faces of the cell, made of LSCoFe ($La_{0.8}Sr_{0.2}Co_{0.8}Fe_{0.2}O_w$) (thickness ranging between 40 and 100 $\mu$m; porosity: 20–70%) (deposition conditions: 800° C./2 h).

The various layers (electrodes, current collectors and protective layers) were deposited by the so-called sprinkler-brush" deposition technique.

The working temperature was 765° C. at $20 \times 10^5$ Pa (20 bar) of oxygen. The system was stable at 1.40 V after 3 days of operation.

Figure 3:
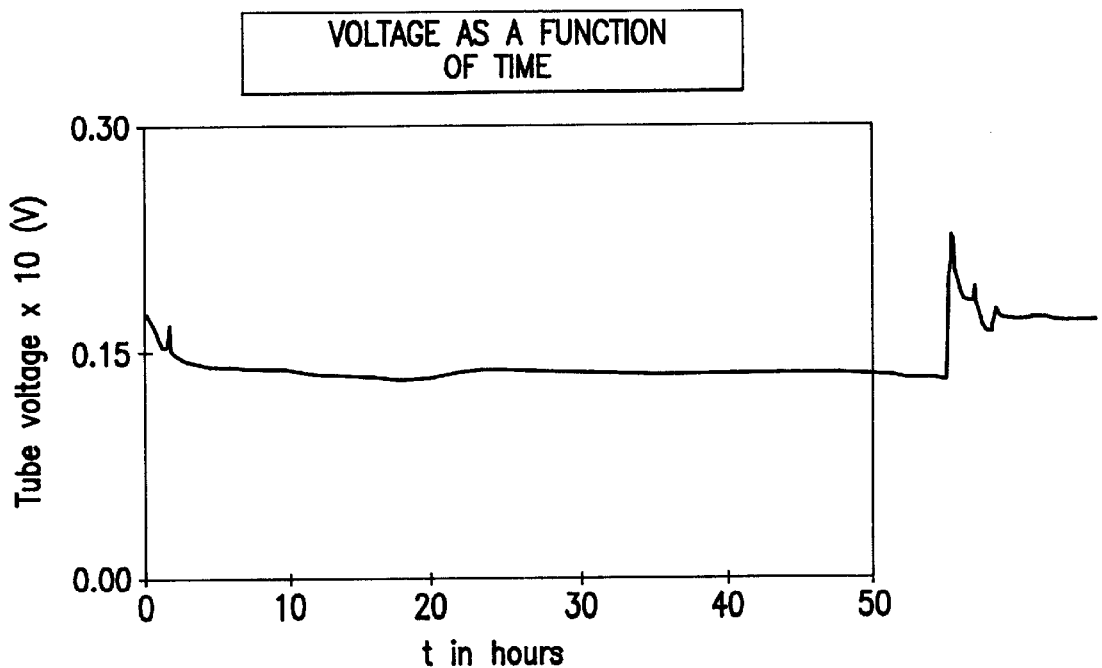
FIG. 3 is a graph analyzing the tubular cell of FIG. 1 under a second set of conditions.

The results are shown in FIG. 3.

EXAMPLE 3

Operating Parameters: Temperature: 750° C.;
Oxygen Internal Pressure: $10 \times 10^5$ Pa (10 bar);
Current: 10 A A tubular electrochemical cell identical to that of Examples 1 and 2 in terms of solid electrolyte, electrodes and protective layer was used. The current collector was no longer an Ag/(8 mol %)YSZ cermet, this being a ceramic oxide which is an ion conductor, but an Ag/LSM cermet, this being a ceramic oxide which is a hybrid conductor of a perovskite type.

The tubular electrochemical cell prepared consists of a solid electrolyte made of (8%)YSZ (length: 355 mm; active area: 68 $cm^2$; thickness: 1.02 mm; internal diameter: 7.5 mm), of two electrodes made of strontium-doped lanthanum manganite (LSM: $La_{0.9}Sr_{0.1}MnO_x$) (thickness: 10–30 $\mu$m; porosity: 30–50%), of two current collectors made of Ag/(8%)LSM cermet (50/50 by volume) (thickness: 50 $\mu$m; porosity between 30 and 50%) and of a protective layer on each of the faces of the membrane made of LSCoFe ($La_{0.8}Sr_{0.2}Co_{0.8}Fe_{0.2}O_w$) (thickness: between 70 and 90 $\mu$m; porosity: 30–50%) (deposition conditions: 800° C./0.5 h). The various layers (electrodes, current collectors and protective layers) were deposited by dip coating.

The results presented relate to a tubular system consisting of five elementary electrochemical cells. The system operated continuously for more than 12 days (300 hours) under $10 \times 10^5$ Pa (10 bar) of oxygen at 750° C. The total voltage of the five-cell system rapidly stabilized (after a few hours) at 6.5 V, i.e. 1.3 V per tube on average. The coulombic efficiency was 100%.

Figure 4:
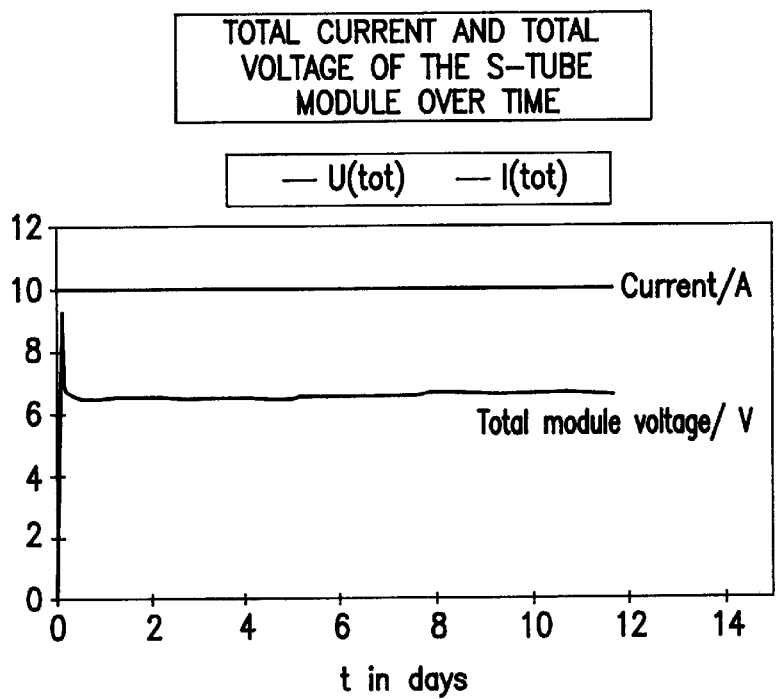
FIG. 4 is a graph analyzing the tubular cell of FIG. 1 under a third set of conditions.

The results are shown in FIG. 4.

Conclusion

In the three examples, the ageing phenomenon is stopped by providing an LSCoFe-based protective layer. In addition, a reduction in the operating temperature slows down, or even stops, the phenomena of sintering/segregation and of diffusion of the metal particles (particularly silver particles) within the solid electrolyte (stabilization of the coulombic efficiency at 100%). It should be pointed out that the protective layer must absolutely be chemically inert not only with respect to the current collector material but also with respect to the materials of the electrode(s) and of the solid electrolyte.

As additional examples leading to the advantageous results described above, there are electrochemical cells in which:
   the protective layer consists of a perovskite of the LSCoFe or other type, possessing hybrid conductivity properties at low temperature (<800° C.). There may also be other crystal structures which are ion or hybrid conductors (so-called Aurivillius, brown millerite, pyrochlore and fluorite phases, etc.);
   the protective layer does not possess hybrid, ionic or electronic conduction properties. It may be an insulator. However, the layer must be sufficiently porous and of controlled thickness in order to allow oxygen diffusion into the system and in order not to have an influence on the electrochemical performance of the cell;
   a mullite or zirconia beads (diameter ranging between 0.2 and 1 mm) may fill the tube so that the internal silver wire is held mechanically in place. These beads may possibly be covered with a current collector layer, of the same nature as the current collector layer deposited on the tubular system (silver lacquer, silver/LSM (50/50 vol %) mixture, gold lacquer, etc.).

What is claimed is:

1. A ceramic membrane that is an oxide ion conductor comprising a non-zero volume, of non-zero total thickness E, of an assembly consisting of:
   (a) a dense layer, having opposed faces of areas S and S' and having a non-zero thickness e, of a solid electrolyte having a crystal structure which is an oxide ion conductor;
   (b) two porous electrodes, which are hybrid conductors and have non-zero thicknesses $e_1$ and $e'_1$, coated on non-zero areas $s_1$, and $s'_1$, of the two opposed faces of areas S and S' of the solid electrolyte;
   (c) two porous current collectors, of non-zero thickness $e_2$ and $e'_2$, coated on non-zero areas $s_2$ and $s'_2$, of the two porous electrodes; and
   (d) at least one porous covering layer, of non-zero thickness $e_3$, coated on a non-zero area $s_3$, of at least one of the collectors, made of a material or of a mixture of materials which is chemically compatible with the materials, or the mixture of the materials of the electrodes, the collectors, and the solid electrolyte, and the sintering temperature of which is very close to the sintering temperatures of the materials, or of the mixtures of materials, of which the electrodes, the collectors and the solid electrolyte are composed, and wherein, the thickness E of the membrane is equal to the sum of the thicknesses of each of the elements in (a)–(d), the electrodes, of identical or different compositions, made of a material or of a mixture of materials represented by the formula (I):

$$M_1M_2O_1 \qquad (I)$$

in which M represents at least one of atoms chosen from La, Ce, Pr, Nd, Pm, Sm, Eu, Gd, Tb, Dy, Ho, Er, Tm, Yb, Lu, Y, Mg, Ca, Sr, and Ba and $M_2$ represents at least one of atoms chosen from Sc, Ti, V, Cr, Mn, Fe, Co, Ni, Cu, and Zn, and the covering layer, coated on at least one of the collectors, or the covering layers, of identical or different compositions, coated on each of the collectors, are compounds or mixtures of compounds of formula (I) as defined above chosen from the group consisting of lanthanum nickel oxide ($LaNiO_3$), calcium lanthanum manganites ($Ca_uLa_vMnO_w$), lanthanum strontium manganites ($La_uSr_vMnO_w$), lanthanum strontium cobaltites ($La_uSr_vCoO_w$), calcium lanthanum cobaltites ($Ca_uLa_vCoO_w$), gadolinium strontium cobaltites ($Gd_uSr_vCoO_w$), lanthanum strontium chromites ($La_uSr_vCrO_w$), lanthanum strontium ferrites ($La_uSr_vFeO_w$) and lanthanum strontium ferrocobaltites ($La_uSr_vCO_dFe_cO_w$), in which u+v and c+d are equal to 1 and is such that the covering layer is electrically neutral.

2. Ceramic membrane as defined in claim 1, comprising two covering layers of non-zero thicknesses $e_3$ and $e'_3$, which are identical or different, coated on non-zero areas $s_3$ and $s'_3$, which are identical or different, of each of the said current collectors, and wherein the thickness E of the said volume of the said membrane is equal to the sum of the thicknesses $e+e_1+e'_1+e_2+e'_2+e_3+e'_3$.

3. Ceramic membrane as defined in claim 2, wherein $e_1=e'_1$, $e_2=e'_2$ and $e_3=e'_3$.

4. Ceramic membrane as defined in claim 2, wherein e ranges between approximately 0.25 mm and approximately 2 mm, $e_1$ and $e'_1$ range between approximately 1 µm and approximately 50 µm, $e_2$ and $e'_2$ range between approximately 1 µm and approximately 100 µm, and $e_3$ and $e'_3$ range between approximately 1 µm and approximately 200 µm.

5. Ceramic membrane as defined in claim 2, in which each of the current collectors is connected to the external part of the circuit by an electronically conducting wire made of a metal identical to that of which the said collector is composed.

6. Ceramic membrane as defined in claim 2, characterized in that it is filled with beads of mullite or of zirconia.

7. Ceramic membrane as defined in claim 1, consisting of a sheet having plane faces of area S and of thickness E.

8. Ceramic membrane as defined in claim 7, consisting of a sheet of length L ranging between approximately 1 cm and approximately 1 m and of width 1 ranging between approximately 1 cm and approximately 1 m.

9. Ceramic membrane as defined in claim 1, consisting of a cylinder of external diameter D and of internal diameter d, wherein the dense layer is cylindrical having the thickness e, of solid electrolyte and half the difference D−d is equal to the sum of the thicknesses e, $e_1$, $e'_1$, $e_2$, $e'_2$ and $e_3$.

10. Ceramic membrane as defined in claims 9, of length L ranging between approximately 1 cm and approximately 1 m.

11. Ceramic membrane as defined in claim 1, in which the solid electrolyte is represented by the formula (II)

$$(M_\alpha O_\beta)_{1-x}(R_\gamma O_\delta)_x \qquad (II)$$

in which M represents at least one trivalent or tetravalent atom chosen from Bi, Ce, Zr, Ga, Th and Hf, α and β are such that the $M_\alpha O_\beta$ structure is electrically neutral, R represents at least one divalent or trivalent atom chosen from Mg, Ca, Ba, Sr, Gd, Sc, Yb, Y, Sm and La, γ and δ are such that the $R_\gamma O_\delta$ structure is electrically neutral and x ranges between 0.05 and 0.30.

12. Ceramic membrane as defined in claim 11, in which the solid electrolyte is a ceramic oxide or a mixture of ceramic oxides, which is chosen from $ZrO_2$, $CeO_2$, $HfO_2$, $ThO_2$, $Ga_2O_3$ and $Bi_2O_3$, which is doped with one or more oxides chosen from MgO, CaO, BaO, SrO, $Gd_2O_3$, $Sc_2O_3$, $Yb_2O_3$, $Er_2O_3$, $Y_2O_3$, $Sm_2O_3$, $In_2O_3$, $Nb_2O_3$ and $La_2O_3$.

13. Ceramic membrane as defined in claim 12, in which the solid electrolyte is yttria-stabilized zirconium oxide of formula (Ia):

$$(ZrO_2)_{1-x}(Y_2O_3)_x$$

in which x is between 0.05 and 0.15.

14. Ceramic membrane as defined in claim 1, in which the electrodes, of identical or different compositions, are made of a material or of a mixture of materials chosen from $LaNiO_3$, $Ca_uLa_vMnO_w$, $La_uSr_vMnO_w$, $La_uSr_vCoO_w$, $Ca_uLa_vCoO_w$, $Gd_uSr_vCoO_w$, $La_uSr_vCrO_w$, $La_uSr_vFeO_w$ and $La_uSr_vFe_cCo_dO_w$, in which u+v and c+d are equal to 1 and 2 is such that the electrodes are electrically neutral.

15. Ceramic membrane as defined in claim 1, in which the current collectors, coated on the two porous electrodes, of identical or different compositions, essentially consist of one of a metal, a metal lacquer, a metal/"inert oxide" ceramic mixture, a metal/"hybrid conductor" oxide ceramic mixture, a metal/"ion conductor" oxide ceramic mixture, a metal/"electron conductor" oxide ceramic mixture, a metal/carbide mixture, and a metal/nitride mixture.

16. Ceramic membrane as defined in claim 15, in which the current collectors, of identical or different compositions, are made of a mixture of a metal chosen from one of the transition metals, and the noble metals, with at least one of the compounds of formula (II), or made of a mixture of a metal as defined above with one or more compounds of formula (I).

17. Ceramic membrane as defined in claim 16, in which the current collectors, of identical composition, are made of a mixture of silver and of an "ion conductor" ceramic such as yttria-doped zirconia.

18. Ceramic membrane as defined in claim 1, in which the covering layer, coated on at least one of the said collectors, or the covering layers, of identical or different compositions, coated on each of the said collectors, are insulating.

19. Ceramic membrane as defined in claim 1, in which the covering layer, coated on at least one of the said collectors, or the covering layers, of identical composition, coated on each of the said collectors, is or are a compound of formula (IIa):

$$La_{0.8}Sr_{0.2}Co_{0.8}Fe_{0.2}O_w \qquad (IIa)$$

in which w is such that the structure of formula (IIa) is electrically neutral.

20. Use of a membrane as defined in claim 1, for separating oxygen from air or from a gas mixture containing it.

21. A ceramic membrane as claimed, in claim 1, wherein the cover layer has a formula $La_uSr_vCO_dFe_cO_w$.

* * * * *